Figure 1:
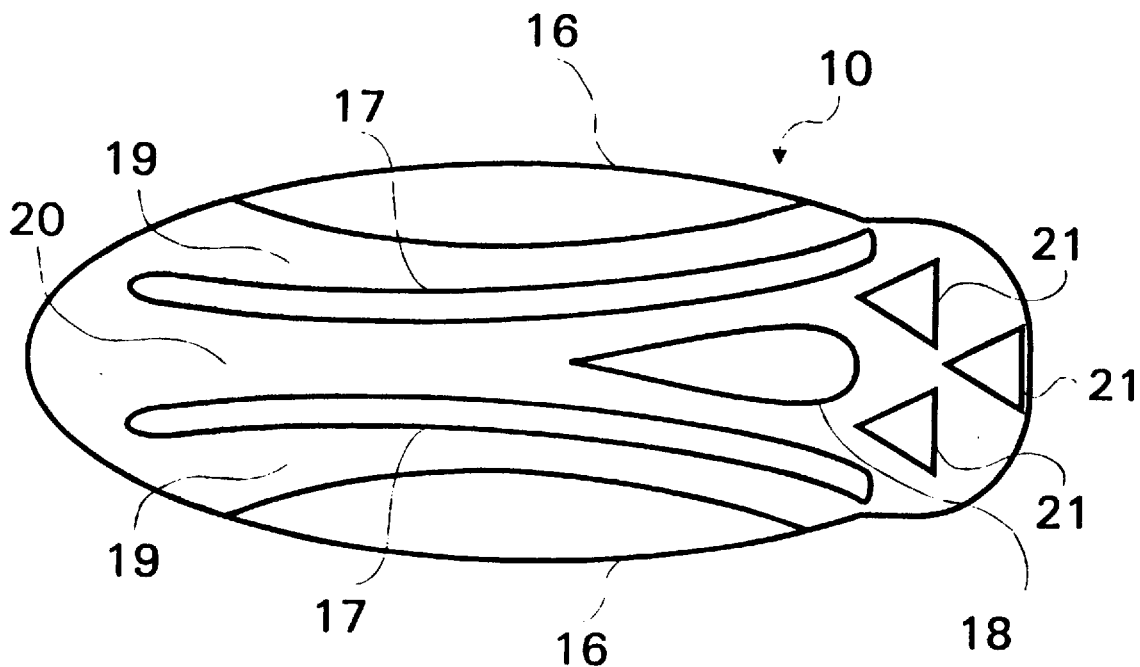

United States Patent

Lavecchia et al.

[11] Patent Number: 5,868,405
[45] Date of Patent: Feb. 9, 1999

[54] SPORTING GOOD

[76] Inventors: Alexander Lavecchia, Engelberstr, 2, 81241, München; Robert Petersen, Hatzfelderweg, 12, 81476, München, both of Germany

[21] Appl. No.: 875,915
[22] PCT Filed: Feb. 9, 1996
[86] PCT No.: PCT/EP96/00584
  § 371 Date: Oct. 30, 1997
  § 102(e) Date: Oct. 30, 1997
[87] PCT Pub. No.: WO96/24411
  PCT Pub. Date: Aug. 15, 1996

[30] Foreign Application Priority Data

Feb. 10, 1995 [DE] Germany ............ 19504464.9

[51] Int. Cl.[6] .................................... A63L 5/03
[52] U.S. Cl. .................................... 280/14.2; 280/18
[58] Field of Search ............ 280/14.2, 18, 18.1, 280/19, 21.1, 208, 609, 608

[56] References Cited

U.S. PATENT DOCUMENTS

| | | | |
|---|---|---|---|
| 3,147,020 | 9/1964 | Nahl | 280/18 |
| 3,374,003 | 3/1968 | Fulsom | 280/18 |
| 3,635,490 | 1/1972 | Damaree et al. | 280/18 |
| 3,678,804 | 7/1972 | Carreiro | 280/18 |
| 4,974,888 | 12/1990 | Morris | 280/609 |
| 5,018,760 | 5/1991 | Remondet | 280/14.2 |
| 5,135,249 | 8/1992 | Morris | 280/607 |

FOREIGN PATENT DOCUMENTS 264712  4/1978  Germany.
271193  9/1978  Germany.

Primary Examiner—Richard M. Camby
Attorney, Agent, or Firm—Rothwell, Figg, Ernst & Kurz, p.c.

[57] ABSTRACT

Sporting device with an oblong, plate-like foundation (10), the underside of which is basically smooth in the front region (13) and in the rear region (14), and is provided with a runner system in the middle region (15), which includes two curved outside runners (16) with an inner side face which is convex, extending basically longitudinally on the foundation (10), which in each case project adjacent to the long edge of the underside of the foundation (10), two curved inside runners (17) with a convex inner side face and a concave outer side face, extending basically longitudinally along the foundation (10), which are arranged between the outside runners (16) and in each case project from the underside of the foundation (10) longitudinally at a distance to the corresponding outside runner (16), and a stabilizing runner (18), which extends along the middle longitudinal line of the foundation (10) between the inner runners (17), and projects from the underside of the foundation (10), whereby the outside runners (16) are lower than the inside runners (17), which for their part are lower than the stabilizing runner (18), characterized in that the stabilizing runner (18) extends from approximately the center of the foundation (10) up to approximately the rear end of the inside runners (17), the distance between the respective inner side face of the outside runner (16) and the concave outer side surface of the inside runner (17) facing it is shorter in back than in front, and the outside runners (16) are wider than the inside runners (17).

11 Claims, 1 Drawing Sheet

# SPORTING GOOD

TECHNICAL AREA

The present invention concerns a sporting device with an oblong, plate-shaped foundation according to the preamble of claim 1.

STATE OF THE ART

The genre-forming state of the art emerges from DE 27 11 930 A1. A device for sliding on snow is depicted in FIG. 7 of this publication, on the underside of which in the middle area a system of guides is provided which includes two outer guides 10, two inner guides 9 between the outer guides 10, and a central guide 8 which can also be shorter or longer than is depicted in FIG. 7. The guides 9 are arranged symmetrically to guide 8 and slightly arched, whereby the arching is greater in the rear area. The outer guide 10 is even more strongly arched than guide 9 (see description, page 24, third and fourth paragraph). From this it follows that the distance between the guides 9 and 10 increases toward the rear. Nothing is said on the height of the guides of the embodiment of FIG. 7 of DE 27 11 930 A1.

Since the guides of the embodiment depicted in FIG. 7 are basically of equal length, the guides form lines of force which essentially run parallel to the longitudinal axis. A change in direction can only be executed by a complete weight shift of at least 50% on one of the parallel force lines. This way, a change in the foot position is required which necessarily leads to a labile center for the operator. If the guides 8, 9, 10 are arranged at equal height, the steering action of the individual guides is mutually cancelled. This can only be avoided by great differences in height as depicted in FIGS. 9 through 12 of DE 27 11 930 A1. Such a measure nonetheless leads to increased angles of inclination and therewith to an instability of the operator in changing direction.

REPRESENTATION OF THE INVENTION

Underlying the invention is the object of creating an easily steerable sporting device with simple means of construction.

This object is realized by a sporting device according to patent claim 1.

The greatest advantage of the sporting device of the invention lies in its maneuverability.

The sporting device of the invention offers, among other things, the possibility of going down slopes standing, sitting, or lying down. Further areas of use of the sporting device of the invention consist, for example, in that the invention can also be used as a sleigh or as a children's sled. The sporting device of the invention also offers its user the possibility of being pulled by a T-bar lift installed on an even surface like when water skiing. The sporting device of the invention in addition offers the user the possibility of bodily activation under the impression of his sense of balance. With the sporting device of the invention, the user can enjoy sliding downhill on snow-covered slopes with the complete maneuverability of a skateboard analogous to surfing without having to transport a heavy sled or a large snow board up the slope.

Advantageous configurations of the sporting device of the invention are the object of patent claims 2 to 7.

SHORT DESCRIPTION OF THE DRAWINGS

An embodiment of the invention is described in greater detail through drawings. Depicted are:

FIG. 1 A view of the sporting device from below.

Figure 2:
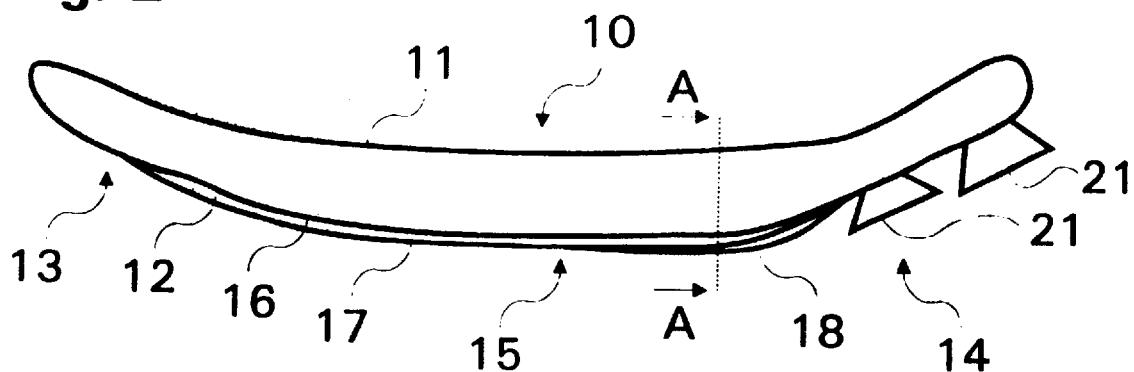

FIG. 2 A side view of the sporting device of FIG. 1.

Figure 3:
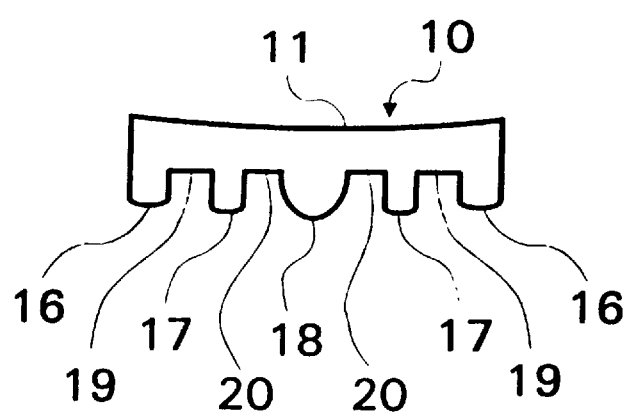

FIG. 3 A cross section A—A through the foundation of the sporting device of FIG. 2.

BEST WAY TO CONSTRUCT THE INVENTION

The sporting device has a basically oval, plate-shaped foundation 10 which has an upper side 11 and an underside 12.

The foundation 10 rises in the front third in an angle of approximately 10° and forms a uniformly slightly arched slope to the tapering front part. The rear two-thirds of the runner support issue level in front of the rear incline in the slope toward the horizontal of the foundation 10, and form a flowing transition to the rear incline. The front area 13, which can occupy ⅙ to 1/10 of the overall length of the foundation 10, and the rear area 14, which can occupy approximately ⅕ to ⅐ of the overall length of the foundation 10, are in each case inclined upward horizontally. The angle between the front area 13 and the horizontal comes to approximately 10° to 20°, for example approximately 15°. The angle between the rear area 14 and the horizontal comes to approximately between 15° and 25°, for example approximately 20°.

The bending of the front area 13 brings about a better stability for the user, an improved sliding behavior of the sporting device, and prevents this, for example, from being able to dip below the snow line.

The underside of the rear area 14 of the sporting device can in addition be outfitted with one to three chocks 21 tapering toward the support surface, for example triangular in design, with a tip at all times directed forward in a longitudinal direction.

The rear chocks 21 lie deeper on account of the rise of the rear area so that the sporting device need not be too strongly lowered when braking.

The sporting device can also be outfitted with several smaller or larger chocks than those represented in FIG. 1 and FIG. 2.

Instead of chocks 21, an appropriate rib or burl profile on the underside of the rear area 14 can also serve as brake carrier.

In order to prevent the user from sliding from the sporting device, the upper side serving as a foot support area of the front area 13, of the rear area 14, and the middle area 15 can be outfitted with anti-slide strips.

The relationship of length, related to the middle longitudinal line, to width and height, in each case related to the center of the foundation 10, comes to between 13:4:1 and 10:7:1, and for example approximately 11.5:5.5:1 with the sporting device.

On the middle area 15 of the underside of the foundation 10, two outside runners 16 and two inside runners 17 are arranged which basically extend in a longitudinal direction.

The outside runners are wide and conceived as support and bearer runners. The inside runners 17 are more slender and longer than the outside runners 16 and are designed as sliding and steering runners. The inside runners 17 run flat to the rear up to the onset of the inclination.

The respective inner side face of the outside runners 16 is convex. The respective outer side face of the inside runner 17 is concave. The respective inner side face of the inside runner 17 is convex.

The proportion of the width in any given case of an outside runner 16 to the width of an inside runner 17 at all times lies approximately in the 3:1 to 2:1 range, for example 2.5:1, at the level of the center.

The distance of the ends of the outside runners 16 from the bottom surface of the notch 19 situated between the respective convex side face of the outside runner 16 and the concave side face of the inside runner 17 facing it comes to between 2.5 and 4 cm, for example 3 cm, as a function of the size of the foundation 10.

The distance of the ends of the inside runners 17 from the bottom surface of the groove 19 situated between the respective convex side face of the outside runner 16 and the concave side face of the inside runner 17 facing it comes to between 3 and 4.5 cm, for example 3.5 cm.

The inside runners 17 are higher than the outer runners 16. The difference in height of the respective ends comes to between 3 and 8, for example 5 mm. The inside runners 17 are at all times curved concavely in the direction of the corresponding long edge, whereby the curvature in the longitudinal direction in the front course is slighter than in the rear slope. This way it becomes possible to steer the sporting device in the desired direction by shifting weight.

The bottom surface of the recess 20 situated between the inside runners 17 can be higher than the bottom surface of the groove 19. The height difference then comes to between 3 and 8 mm, for example 5 mm, as a function of the thickness of the foundation 10.

A stabilizing runner is situated on the longitudinal center line beginning from approximately the center of the sporting device up to approximately the back end of the inside runners 17, which is higher than the inside runners 17 at its highest and widest point. The difference in height of the respective ends comes to between 3 and 8 mm, for example 5 mm.

The stabilizing runner 18 runs longitudinally sharply toward the front and broadly toward the rear. The end of the stabilizing runner 18 runs level from the middle of the foundation 10 to the rear and is drop-like in design.

The runners 16, 17, and 18 run longitudinally toward the front and flat toward the rear. The inside runners 17 can run out to approximately the middle of the front incline.

The sporting device can have a bore hole in the front region for fastening a tow line.

Owing to the previously described construction of the underside 12, the following maneuvering possibilities of the sporting device emerge:

1. The weight of the user is evenly distributed on the front and rear region of the sporting device:
   a) by shifting the weight to the left side, the sporting device executes a gentle left turn;
   b) by shifting the weight to the right side, the sporting device executes a gentle right turn.
2. The weight of the user lies for the greater part on the rear area:
   a) by shifting the weight to the left side, the sporting device executes a sharper left turn;
   b) by shifting the weight to the right side, the sporting device executes a sharper right turn;
   c) a centering of the weight on the stabilization runner 18 makes attaining greater speeds possible as well as riding in deeper snow, and the rapid and maneuverable execution of the maneuvers described under 2*a*) and 2*b*).

Owing to these strongly marked maneuvering possibilities and owing to the fact that the sporting device is as a rule no larger than a customary sled, and in accordance with one embodiment is light, the danger of injury for the user as well as for other persons is considerably diminished, for example, in comparison with other winter sporting devices, such as sleds, plastic bobsleds, snow boards, or skis.

The maneuverability of the sporting device corresponds to that of a skateboard. The sporting device thereby offers ideal opportunities for complementing skateboarding, which is done in summer, in the winter as no adaptation is necessary.

The foundation 10 of the sporting device can be cast from a heat-hardenable plastic, for example, an epoxy resin, which can be additionally reinforced with fiberglass, or a methacrylate or polyester resin, or be composed of corresponding shaped parts. The foundation 10 of the sporting device can also consist of high density polyethylene.

The foundation 10 of the sporting device can also consist of a hard foam material core, for example polyurethane or polystyrene hard foam, and a casing of a heat-hardenable plastic, for example an epoxide resin, which can in addition be reinforced with fiberglass, or of a methacrylate or polyester resin.

In one embodiment, the core of the foundation 10 consists of polyurethane hard foam material and a casing of epoxide resin which is reinforced with fiberglass.

We claim:

1. Sporting device with an oblong, plate foundation (10), the underside of which is basically smooth in the front region (13) and in the rear region (14), and is provided with a runner system in the middle region (15), which includes two curved outside runners (16) with an inner side face constructed convex, extending basically longitudinally on the foundation (10), which in each case project adjacent to the long edge of the underside of the foundation (10), two curved inside runners (17) with a convex inner side face and a concave outer side face, extending basically longitudinally along the foundation (10), which are arranged between the outside runners (16) and project from the underside of the foundation (10) longitudinally at a distance to the corresponding outside runner (16), and a stabilizing runner (18), which extends along the middle longitudinal line of the foundation (10) between the inner runners (17), and projects from the underside of the foundation (10), whereby the outside runners (16) are shorter than the inside runners (17), which are shorter than the stabilizing runner (18), characterized in that the stabilizing runner (18) extends from approximately the center of the foundation (10) up to approximately the rear end of the inside runners (17), the distance between the respective inner side face of the outside runner (16) and the concave outer side surface of the inside runner (17) facing it is shorter in back than in front, and the outside runners (16) are wider than the inside runners (17).

2. Sporting device according to claim 1, characterized in that the front area (13) and the rear area (14) are upwardly inclined toward the horizontal.

3. Sporting device according to claim 2, characterized in that the angle between the front region (13) and the horizontal comes to approximately 15° and the angle between the back area (14) and the horizontal comes to approximately 20°.

4. Sporting device according to one of claims 1, characterized in that the runners (16, 17 and 18) run flush to the front and back area.

5. Sporting device according to one of claims 1, characterized in that the underside of the rear area (14) of the foundation is outfitted with one or more chocks (21).

6. Sporting device according to one of claims 1, characterized in that the upper side of the front area (13), the rear area (14), and the middle area (15) of the foundation is outfitted with anti-slide strips.

7. Sporting device according to one of claims 1, characterized in that it comprises a polyurethane-hard foam core with a case of epoxy resin which is reinforced with fiberglass.

8. Sporting device according to claim 3, wherein the runners run flush to the front and back area.

9. Sporting device according to claim 8, wherein the underside of the rear area of the foundation is outfitted with at least one chock.

10. Sporting device according to claim 9, wherein the upper side of the front area, the rear area, and the middle area of the foundation is outfitted with anti-slide strips.

11. Sporting device according to claim 10, wherein a polyurethane-hard foam core with a case of epoxy resin which is reinforced with fiberglass is provided.

* * * * *